March 23, 1937.  M. HAGEDORN ET AL  2,074,647

MANUFACTURE OF FOILS AND ARTIFICIAL PRODUCTS

Filed June 27, 1933

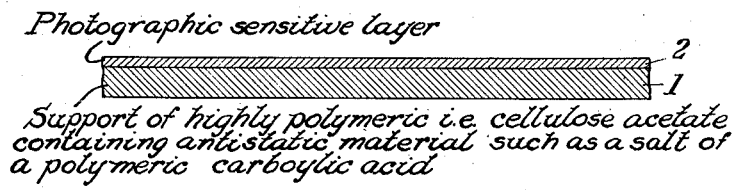

Fig. 1

Photographic sensitive layer

Support of highly polymeric i.e. cellulose acetate containing antistatic material such as a salt of a polymeric carboylic acid

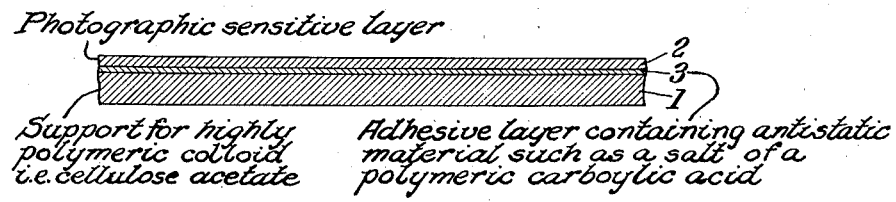

Fig. 2

Photographic sensitive layer

Support for highly polymeric colloid i.e. cellulose acetate

Adhesive layer containing antistatic material such as a salt of a polymeric carboylic acid

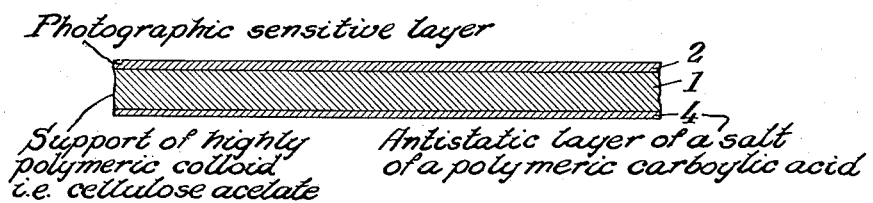

Fig. 3

Photographic sensitive layer

Support of highly polymeric colloid i.e. cellulose acetate

Antistatic layer of a salt of a polymeric carboylic acid

Inventors:
Max Hagedorn,
Armin Ossenbrunner,

By  Attorney
Philip S. Hopkins.

Patented Mar. 23, 1937

2,074,647

UNITED STATES PATENT OFFICE 2,074,647

MANUFACTURE OF FOILS AND ARTIFICIAL PRODUCTS

Max Hagedorn and Armin Ossenbrunner, Dessau-in-Anhalt, Germany, assignors to Agfa Ansco Corporation, Binghamton, N. Y., a corporation of New York Application June 27, 1933, Serial No. 677,930
In Germany July 2, 1932

6 Claims. (Cl. 95—9)

Our present invention relates to the manufacture of antistatic articles.

One of its objects is to provide moulded articles which have the property to prevent defects due to electrical discharges. Further objects will be seen from the detailed specification following hereafter.

In the accompanying drawing Fig. 1, Fig. 2, and Fig. 3 are diagrammatic sections of three embodiments according to this invention applied to a photographic film.

It is well known that sheets or films and other artificial products manufactured from cellulose derivatives, polyvinylchlorids, and similar materials, as well as highly dry gelatin and casein sheets become easily charged by static electricity. This property is frequently very troublesome; for instance, in the case of photographic films made from nitrocellulose or acetyl cellulose, the photographic emulsion layer is liable to so-called static markings which are capable of development and thus spoil the film. Furthermore, sparks produced while preparing, treating, and, more particularly, unwinding celluloid films have sometimes given rise to ignition of the film. It is also undesirable that very thin foils of polyvinylchloride or acetyl cellulose, such as are used for the manufacture of cigarette tips or for purposes of the textile industry, should receive static charges as such thin foils when thus charged, tenaciously stick to non-conductors, and can be removed therefrom without injury only with difficulty.

According to this invention a sheet or foil made from a highly polymeric colloid can largely be preserved from static charges by the application in its manufacture of a polymeric aliphatic or aromatic carboxylic acid, or a salt thereof. Whereas the anti-static effect of most of the additions which hitherto were recommended for reducing the electric excitability, is due merely to their hygroscopic properties so that the articles treated with these additions absorb a skin of water, and often fail to be effective when the articles are in a dry condition, the substances used according to this invention remain active even when thoroughly dry. Instead of the free acid or a salt thereof, there may be employed a mixed polymerization product or condensation product which contains the acid or a salt thereof. In this case the degree of efficiency depends on the amount of the polymeric acid or its salt present in the mixed polymerization product or mixed condensation product used. The selection of the free acids or the salts depends on the solubility and on the intensity of the effect required.

Materials which can be made into film and threads are electrifiable highly polymeric colloids, for instance, cellulose derivatives, polyvinyl compounds (esters, polyvinyl alcohol/aldehyde condensation products), albumen derivatives, such as gelatin and similar substances. Among the highly polymeric aliphatic or aromatic carboxylic acids, for instance the following are suitable: Polyglucuronic acid, polyacrylic acid, and polystyrolcarboxylic acid, and the alkali salts of these acids. Furthermore there may be used: mixed polymerization products, for instance, from a mixture of vinylchloride and acrylic acid, of nitrilo-acrylic acid and acrylic acid, of styrol and acrylic acid, of vinyl-methyl ether, nitrilo-acrylic acid and styrolcarboxylic acid, and the salts thereof. These compounds may be combined with the films during their manufacture or, as it is often preferred, may be combined with the films as a separate layer and thus, in many cases, may substitute the layers hitherto employed, for instance, layers of gelatin.

The accompanying drawing shows the invention applied to a photographic film. In Fig. 1 the support 1 is made from an electrifiable highly polymeric colloid, for instance cellulose acetate with the addition of a polymeric carboxylic acid. This support bears the light sensitive layer 2. In another embodiment shown in Fig. 2 the support 1 is made from an electrifiable highly polymeric colloid, for instance cellulose acetate. The light sensitive layer 2 is connected with the support 1 by means of the adhesive layer 3 containing a substantial amount of polymeric carboxylic acid or a salt thereof. Still another embodiment is shown in Fig. 3. In this figure 1 is the support consisting of an electrifiable highly polymeric colloid, for instance cellulose acetate coated on one side with the light sensitive emulsion layer 2, and on the other side with the antistatic layer 4, consisting of or comprising a substantial amount of polymeric carboxylic acid or a salt thereof.

The following examples illustrate the invention:

Example 1

A 1 per cent. solution of a polymerization product from a mixture of 40 per cent. of nitrilo-polyacrylic acid and 60 per cent. of sodium polyacrylate, in a mixture of acetone and methanol, is applied in known manner on both sides of a film of cellulose acetate of 200 thickness. Such a film which, even when dried for several hours at 80° C., is capable of immediately discharging a charged electrometer, is coated with a photographic emulsion on its two sides, without any previous treatment being applied, and can be employed in X-ray work.

Example 2

A ¼ per cent. solution of the polyacrylic acid derivative of Example 1 in a mixture of equal parts of methyl alcohol and ethyl alcohol is applied on a film of 130μ thickness. The film thus coated may be made into a cinematographic film, a color-screen film, a photographic film, or the like. The film has such an anti-static power that even after rubbing the coated unexposed film, no marking due to an electric charge is noticeable on the developed film.

Example 3

A foil of 30μ thickness made from polyvinylchloride is treated with a ½ per cent. solution of methylene chloride and a polymerization product from a mixture of 75 per cent. of polyvinylchoride and 25 per cent. of polyacrylic acid. In contrast to an untreated foil, the treated foil shows, when unwinding it from the bobbin, no sticking properties as due to static charge.

Example 4

The addition of 20 to 50 per cent. of a substance obtained by saponifying the polymerization product from a mixture of 95 per cent. of polyacrylic methyl ester and 5 per cent. of nitrilo-polyacrylic acid transformed into the free acid, to nitrocellulose produces a diminution of the electric excitability. Such films are preferably used for the manufacture of photographic films of any kind.

What we claim is:

1. A photographic film comprising a support of cellulose acetate, a layer consisting of the polymerization product from a mixture of 40 per cent. of nitriloacrylic acid and 60 per cent. of sodium acrylate attached to both sides of said support, and a light sensitive layer attached to said layers of said polymerization product.

2. A photographic film comprising a support of nitrocellulose, a layer consisting of the polymerization product from a mixture of 40 per cent. of nitrilo-acrylic acid, and 60 per cent. of sodium acrylate attached to one side of said support, and a light sensitive layer attached to said layer of said polymerization product.

3. A moulded article comprising an electrifiable highly polymeric colloid and a compound selected from the group consisting of an alkali metal salt of a polymeric carboxylic acid, mixed polymerization products containing an alkali metal salt of a polymeric carboxylic acid, and mixed condensation products containing an alkali metal salt of a polymeric carboxylic acid.

4. A photographic film comprising a support comprising an electrifiable highly polymeric colloid and a compound selected from the group consisting of an alkali metal salt of a polymeric carboxylic acid mixed polymerization products containing an alkali metal salt of a polymeric carboxylic acid, and mixed condensation products containing an alkali metal salt of a polymeric carboxylic acid, and attached to at least one side of this support a light-sensitive layer.

5. A photographic film comprising a support consisting of an electrifiable highly polymeric colloid, an adhesive layer, attached to at least one side of said support, said adhesive layer comprising a compound selected from the group consisting of an alkali metal salt of a polymeric carboxylic acid, mixed polymerization products containing an alkali metal salt of a polymeric carboxylic acid, and mixed condensation products containing an alkali metal salt of a polymeric carboxylic acid and a light-sensitive layer attached to said adhesive layer.

6. A photographic film, comprising a support consisting of an electrifiable highly polymeric colloid, a layer comprising a compound selected from the group consisting of an alkali metal salt of a polymeric carboxylic acid, mixed polymerization products containing an alkali metal salt of a polymeric carboxylic acid, and mixed condensation products containing an alkali metal salt of a polymeric carboxylic acid and a light-sensitive layer, attached to the other side of said support.

MAX HAGEDORN.
ARMIN OSSENBRUNNER.